E. THOMAS.
COMBINED TYPE WRITING AND COMPUTING MACHINE.
APPLICATION FILED AUG. 1, 1913.

1,292,151.

Patented Jan. 21, 1919.
5 SHEETS—SHEET 1.

WITNESSES:
F. E. Alexander
Geo. N. Naylor

INVENTOR:
Edward Thomas
BY
ATTORNEY.

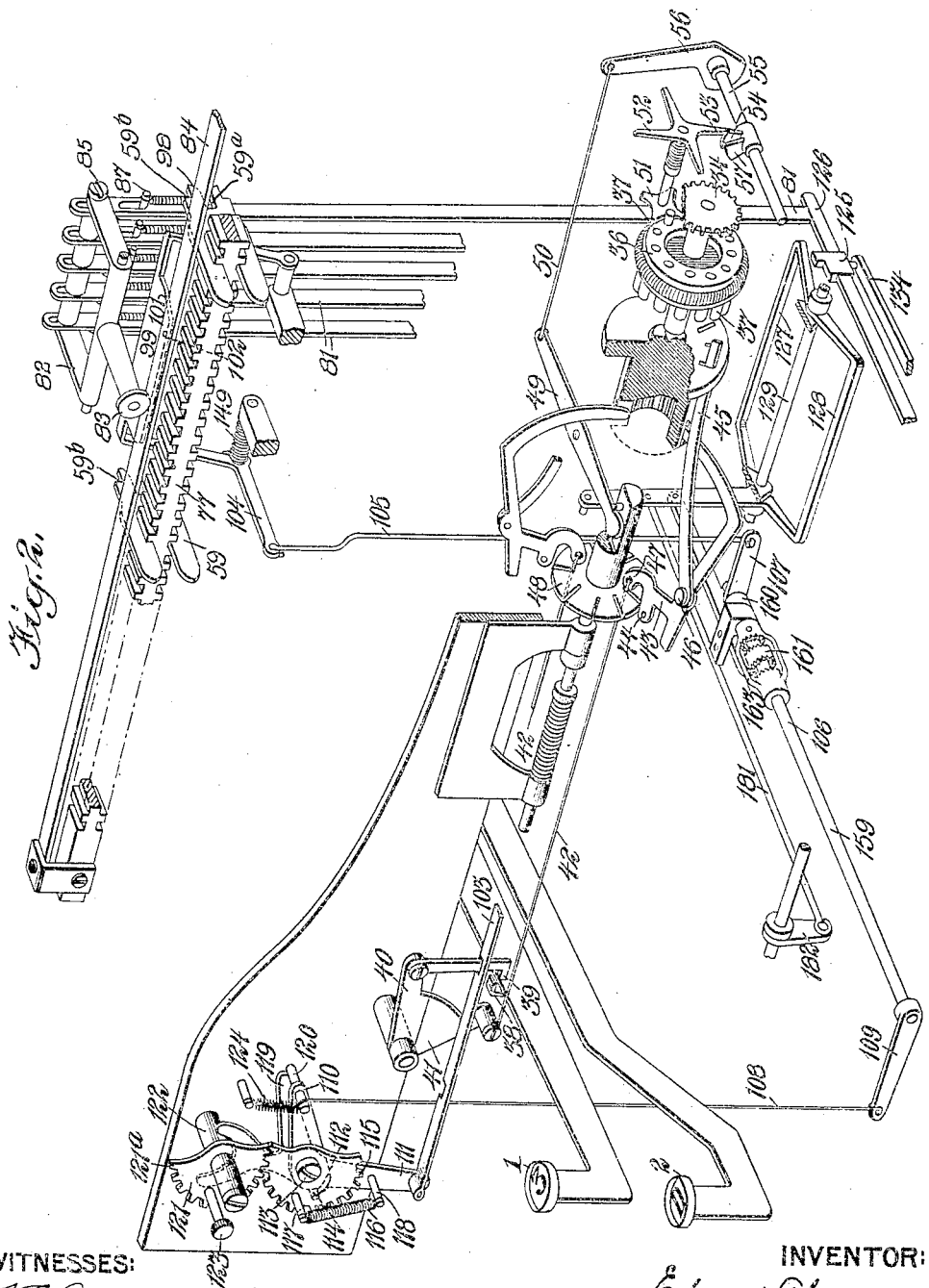

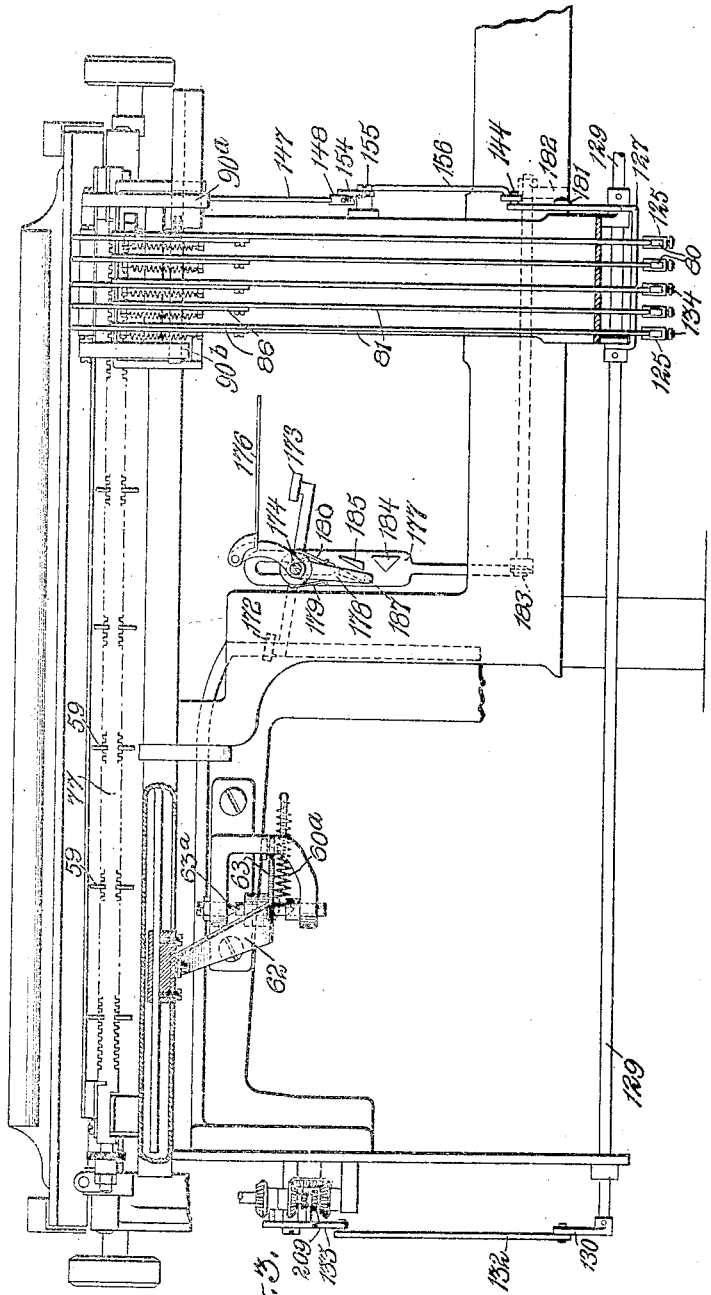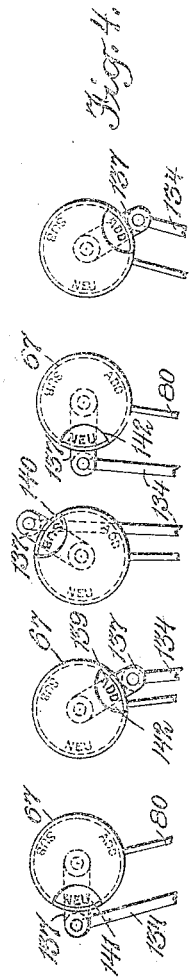

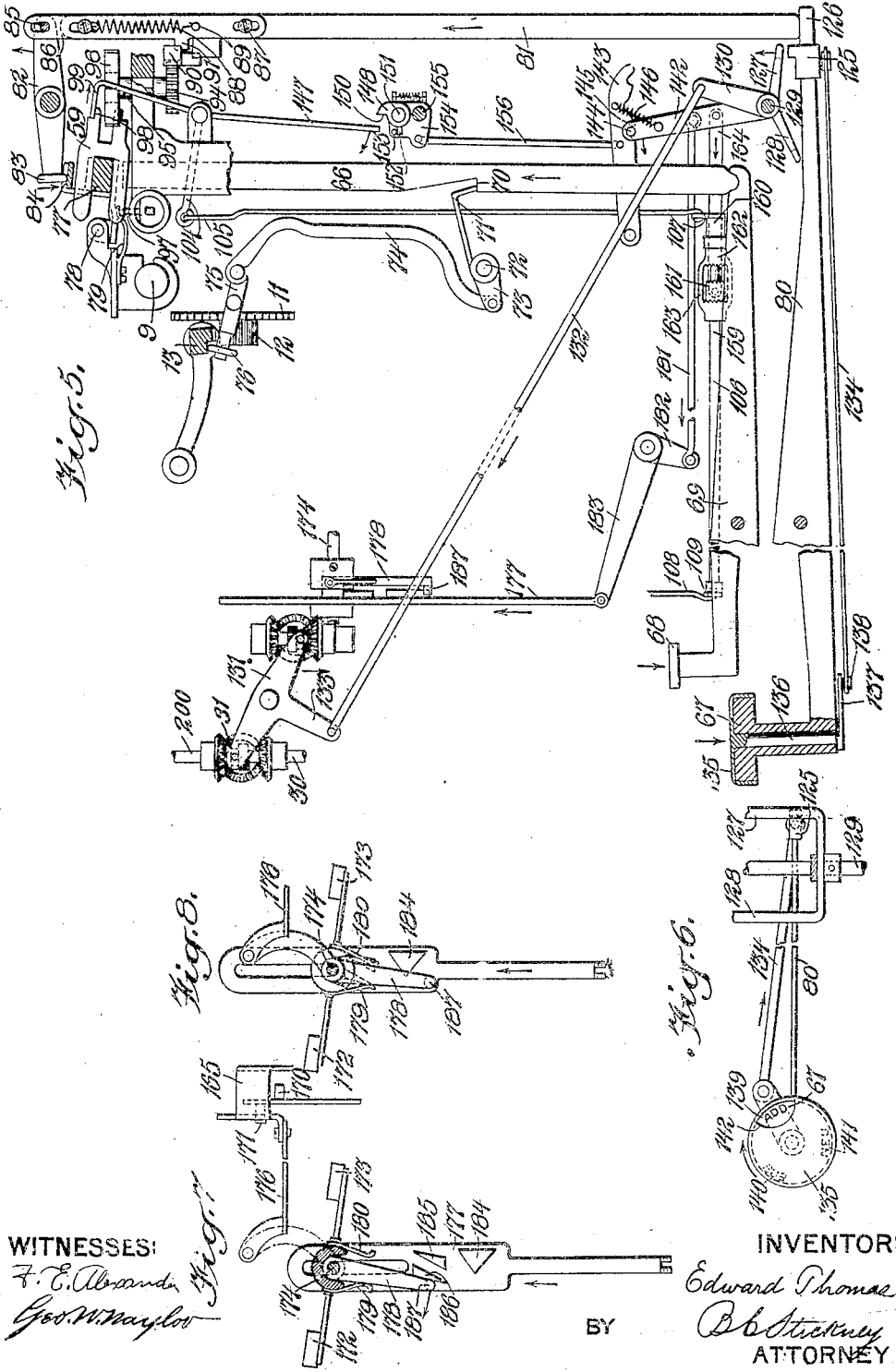

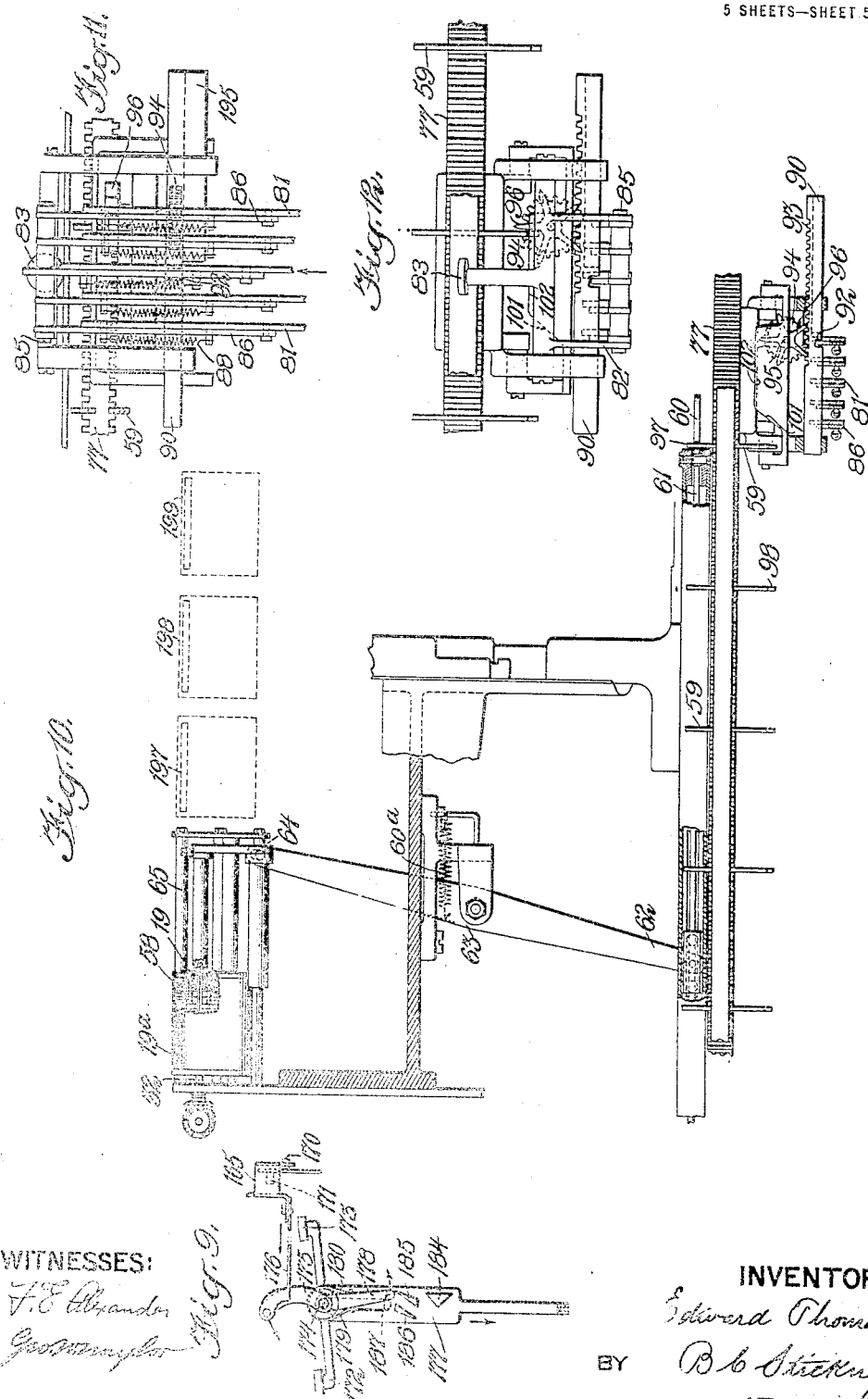

UNITED STATES PATENT OFFICE.

EDWARD THOMAS, OF NEW YORK, N. Y., ASSIGNOR, BY MESNE ASSIGNMENTS, TO UNDERWOOD COMPUTING MACHINE COMPANY, OF NEW YORK, N. Y., A CORPORATION OF NEW YORK.

COMBINED TYPE-WRITING AND COMPUTING MACHINE.

1,292,151.            Specification of Letters Patent.     Patented Jan. 21, 1919.

Application filed August 1, 1913. Serial No. 782,391.

*To all whom it may concern:*

Be it known that I, EDWARD THOMAS, a citizen of the United States, residing in New York, in the county of New York and State of New York, have invented certain new and useful Improvements in Combined Type-Writing and Computing Machines, of which the following is a specification.

My invention relates to combined type-writing and computing machines, and more especially to simplifying and improving the means by which the operative may determine whether said machines shall add, subtract, or leave uncomputed the numbers as written in various columns by such machines.

For the purpose of illustration, my invention is herein shown as applied to an Underwood-Wright combined typewriting and computing machine in which the numeral keys of the typewriter control an escapement through which a motor turns the master wheel, the keys by their operation on said escapement determining how far the motor shall turn the computing wheel then connected thereto by the master wheel whenever a given key is operated.

Typewriting machines, such as the Underwood, are often furnished with combined column-selecting, that is, those arranged to select a major column or zone, and decimal-tabulating keys, that is, those arranged to select a digit column or letter space in a zone, and my invention is herein disclosed as applied to such machines. In such machines whenever a column-selecting and a decimal-tabulating key are properly depressed, the typewriter carriage is released and travels along until arrested at a point determined by the two tabulating keys then depressed, which point may be in any zone and at any digit column or letter space in that zone. One set of said tabulating keys, preferably the column-selecting keys, according to my invention, may be provided with a connection for determining whether the computing mechanism shall be effective or not, and whether it will add or subtract when the typewriter carriage comes to rest after the operation of such a key. For this purpose, each of such keys may be provided with a settable lug or interponent which becomes effective whenever the key is operated, to so adjust the connections between the numeral keys and the computing mechanism as to effect any desired form of computation.

When the typewriter carriage has reached the end of the column in which work is to be done, means may be provided whereby the computing machine connections may become ineffective, so that no further computations will be effected by the numeral keys of the typewriter until another tabulating key of the proper kind is depressed.

To obtain such a result, my invention is herein disclosed as applied to a column-selecting device of the type disclosed in the patent to Lester A. Wernery, No. 1,108,415, dated August 25, 1914. In said patent the usual column stops are settable along a rack bar which is pivotally mounted on the typewriter carriage. Said column stops are normally out of reach of the key-operated counter or decimal stops. When, however, the proper column is reached, the rack bar with its stops, is moved down to a position where the column stops will intercept any effective decimal stop, and bring the typewriter carriage to rest. Where such a structure is used in carrying out my invention, the mechanism may include means for holding said rack bar and its stops in their effective position until the typewriter carriage has passed clear of the column in which computing is to be done.

The connections for so holding the rack bar and its stops may include means for simultaneously holding the connection of the typewriting machine to the computing machine in its adjusted position until the end of the column is reached. The release of the rack bar may then be arranged to release said computing machine connection so that it moves back to ineffective or any normal position.

The invention is herein shown as applied to a cross-adding machine of the Underwood-Wright type, such as is disclosed in Wright's application No. 574,813, filed August 1, 1910 (now Patent No. 1,244,398, dated October 23, 1917), wherein there is shown a computing machine carriage, which is intermittently connected to the typewriter carriage in such a manner that the computing mechanism operates a totalizer several times in one traverse of the typewriter carriage. According to the mechanism disclosed in said Wright application, the computing machine carriage is connected to the typewriter carriage intermittently, by means of a hook, which hook is intercepted by lugs settable on the ordinary tabulating rack bar of the Underwood typewriting machine. When caught by one of said lugs, the hook is drawn along until it is released, and the carriage is automatically returned to its starting point. In said Wright application, these lugs are shown as extensions of the ordinary column stops. According to the present invention the ordinary column stops may be likewise utilized to catch said hook, and to hold said hook until the end of the column is reached. The release of the column stop rack bar, as above described may cause the stop which has been engaged with the hook to be released therefrom, and then as described in said Wright application, the computing machine carriage may be automatically drawn back to its starting point.

From the above outline, it will be noted that the typewriter carriage merely connects and disconnects the computing machine connections, while the column-selecting keys themselves determine in what way said connections shall be effective. It will also be noted that by having the addition and subtraction control on the column-selecting keys themselves, there is little likelihood of mistakes in adjusting the mechanism. The adjustment of the stops on the typewriter carriage determines where the column shall be and when the connections of the computing machine to the typewriting mechanism will take place, while the mere fact that the column selected is selected by a given column key determines how the computing connections shall be effective. This avoids the necessity of having complex or diverse forms for the column stops, and also avoids the necessity of having to adjust any other devices with reference to such stops whenever a stop is shifted.

To insure accuracy in the operation of the machine, certain safety devices may be employed, such as an interlock between the column-selecting keys and the decimal-tabulating keys so that it will be impossible to release the typewriter carriage until the computing machine connection has been adjusted by the tabulating key operated.

Other features and advantages will hereinafter appear.

In the accompanying drawings,

Fig. 2 is a skeleton perspective view showing the principal parts of my invention.

Fig. 3 is a rear view of the machine.

Fig. 4 is a plan view of the column-selecting keys.

Fig. 5 is a side view, largely broken away, similar to Fig. 1, but showing the mechanism with a decimal - tabulating and a column-selecting key depressed.

Fig. 6 is a plan view of part of the connections between the column - selecting key and the computing machine connection.

Fig. 7 is a rear view of the connections for a bichrome ribbon-shift when moving from subtracting (when black) to neutral position.

Fig. 8 is a view of the same at the completion of its movement from neutral black to adding black position.

Fig. 9 is a view of the same at the completion of its movement from neutral black to subtracting red.

Fig. 10 is a plan view of the connections between the typewriter carriage and the computing machine carriage.

Fig. 11 is a rear view of the column-selecting device.

Fig. 12 is a plan view of the same.

Figure 1:
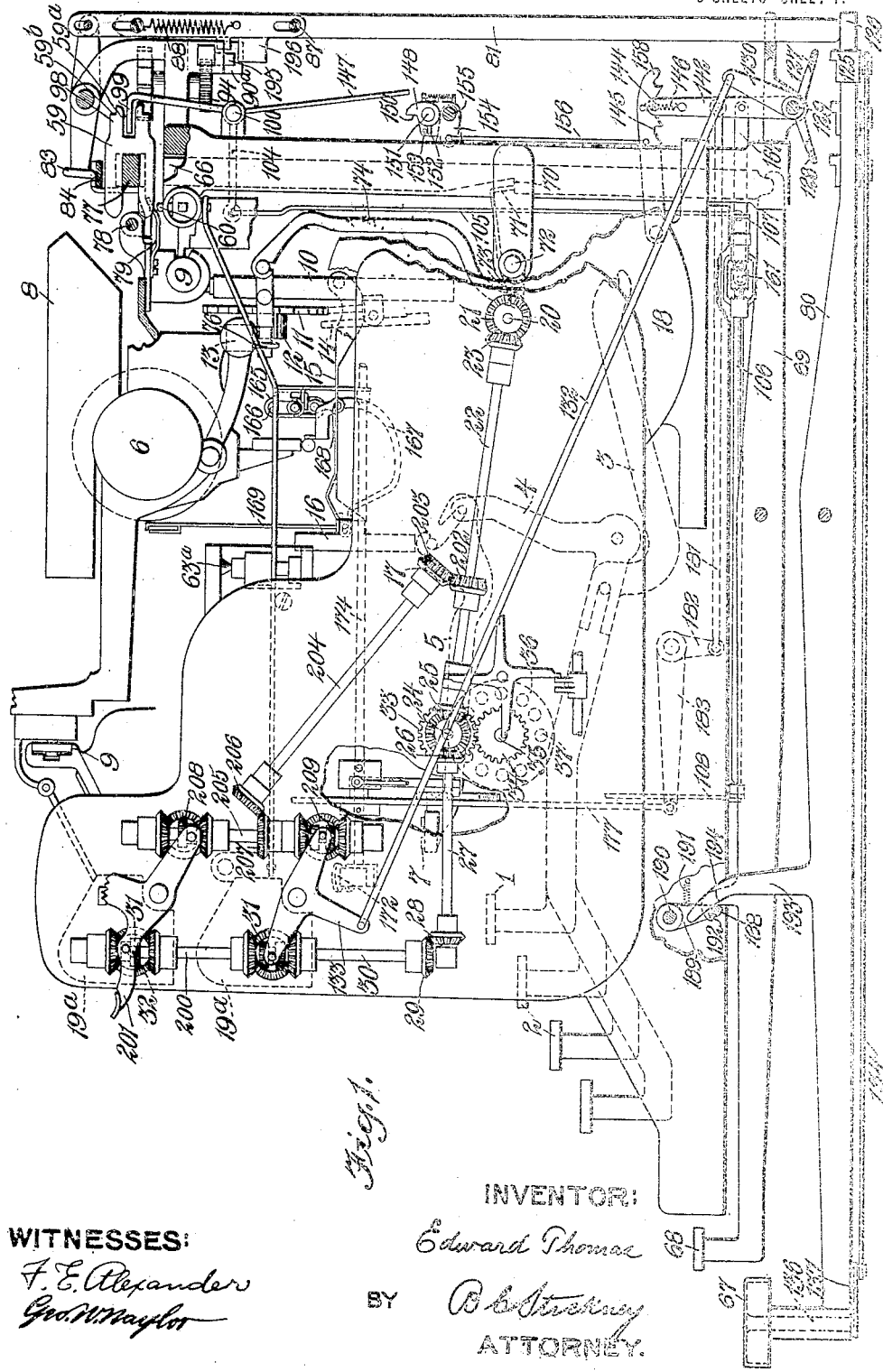
Figure 1 is a sectional side view of an Underwood typewriting machine showing my invention as applied thereto.

In the usual Underwood typewriting machine, numeral keys 1 and alphabet keys 2 depress key levers 3, rocking elbow levers 4 forwardly so as to thereby swing type-bars 5 upwardly and rearwardly against a platen 6, so as to cause type 7 on said type-bars 5 to print on a work-sheet passed around the platen 6. Said platen is mounted in a carriage 8 which travels on rails 9, being drawn by a spring-barrel 10, and its travel is controlled by an escapement wheel 11 connected to a pinion 12, which pinion meshes with a rack bar 13 attached to the typewriter carriage. Said escapement wheel is controlled by dogs 14, said dogs being rocked by a frame 15 forming part of a universal bar 16, said universal bar being operated by heels 17 on the type-bars every time a type prints on the platen 6.

The computing mechanism may be of the usual Underwood-Wright type in which a motor 18 (see Fig. 1) operates computing wheels 58 in a totalizer 19ª through a master wheel 19 (see Fig. 10) through connections hereinafter described. Said connections are of the general type shown in the patents to Gustave O. Degener, Nos. 990,238, dated April 25, 1911, and 1,010,349, dated November 28, 1911, wherein the motor, by means of a suitable friction clutch, tends to turn a power shaft 20 carrying a bevel pinion 21, which latter turns a shaft 22 by means of a pinion 23, said shaft 22 being geared to an escapement shaft 24 by means of a bevel pinion 25; and said escapement shaft, by means of a bevel pinion 26, determines how far a shaft 27 fast to the bevel pinion 26 shall turn. Said shaft 27, by means of bevel gears 28 and 29, turns a vertical shaft 30 which, by means of the usual Underwood-Wright reversible clutch 31, may be geared to the shaft 32 on which the master wheel 19 is splined. Through these connections it will be seen that the motor will turn the master wheel to an extent determined by the escapement shaft.

The numeral keys are provided with connections settable so that the operation of any numeral key will permit said escapement shaft to turn to an extent determined by the numeral key operated. For this purpose the escapement shaft 24 is fast to a gear wheel 33, which gear wheel meshes with a gear wheel 34 fast on the shaft 35 of a primary escapement or index-wheel 36. Said index-wheel 36 is provided with a series of digit-determining settable stops or pins 37, one of which pins is projected to an effective position every time a numeral key is operated to effect a computation.

To thus project a pin, each numeral key 1 has on its lever 3 a lug 38, which lug, whenever the numeral key is depressed, catches a hook 39 depending from a bell crank lever 40, the other arm 41 of said bell crank lever having attached thereto a link 42 which draws on a pin-setting lever 43 in such a way that every time the numeral key 1 is operated, its pin-setting lever 43 will rock about its pivot 44 and cause a jack 45 pivoted to the end 46 of said lever to strike against one of the pins 37, thus projecting it to effective position.

In so projecting the pin to effective position, the link 42 operates a secondary escapement to release the index wheel 36. To do this it draws the end 47 of its pin-setting lever against a universal disk 48, causing said disk to rock a lever 49 so that a link 50 attached to the opposite end of said lever will release the index-wheel 36 which hitherto has been held arrested by a previously-projected pin 37. Said index-wheel constantly tends to turn under the torque of the motor, but has been held against rotation by its previously-projected pin 37 which bears against a star wheel 51, said star wheel being prevented from rotation by means of a four-toothed wheel 52 fast to its shaft, one of whose teeth 53 has been held against rotation by means of a dog 54 on a rock shaft 55.

Whenever a numeral key is depressed, as has been described, the disk 48 by means of the link 50 swings the rock shaft 55 through an arm 56 fast thereon, and causes the dog 54 to slip past the tooth 53 which it has been holding, so that a second dog 57 also fast on the rock shaft 55 will then hold the tooth 53. When the numeral key is released, the shaft 55 is rocked back to its normal position by the disk 48, thus slipping the dog 57 clear of the tooth 53 and permitting the star wheel 51 to be rotated by the previously-projected pin 37.

Said pin, as described in said Degener patents, is restored to its ineffective position by means of a cam (not shown herein), and the index wheel turns under the torque of the motor until the pin 37 just projected strikes the star wheel 51. This wheel is arrested by another tooth 53 of the wheel 52 striking the dog 54, which the backward motion of the disk 48 has returned to effective position, thereby arresting the index wheel 36. The result of this operation has been to allow the index wheel to rotate to an extent determined by the distance between the previously-projected pin and the pin just projected by the operation of the numeral key. When the master wheel 19 is thus turned at the depression of a numeral key, it turns the computing wheel 58 with which it is engaged to the extent determined by the index wheel 36.

As has been described above, the operation of a numeral key causes the typewriter carriage to be fed forward by its escapement wheel 11. Whenever the typewriter carriage thus feeds forward, it causes the master wheel 19 to move in the opposite direction one step for each letter-space.

The connections for accomplishing this result may include the usual column stops 59 of an Underwood typewriting machine, which, in the general manner described in the co-pending case of Walter Wright, No. 574,813, filed August 1, 1910, intermittently engage a hook 60 (Figs. 1 and 10) on the end of a draw rod 61, so as to swing the rear end 62 of a horizontal lever 63, pivoted between its ends at 63ª, the forward end of said lever being connected by a pin-and-slot connection at 64 to the computing machine carriage 65. This carriage 65 carries the master wheel 19 along, causing it to travel and engage *seriatim* the computing wheels 58.

In addition to the step-by-step movements of the carriage 8, the carriage may be given jump movements so that it can be positioned almost instantaneously in any major column or zone and at any letter-space or digit column in such zone. This is accomplished similarly as in said Wernery patent by a series of major-column-selecting or zone-selecting keys 67 and a series of decimal-tabulating (digit-column or letter-space selecting) keys 68. That is to say, the depression of one of the series of keys 67 determines what particular zone in the travel of the carriage, the carriage will stop at, and the subsequent depression of one of the keys 68 will determine at what particular digit column or letter space in such zone the carriage will stop, provided the key 67 is meanwhile held down. In other words, to bring the carriage to the desired letter-space and column, a decimal and column key must be simultaneously held down, just as in the Wernery patent. A key 67 must first be depressed to determine at what major column or zone the carriage will stop before one of the tabulating keys 68 is depressed to release the carriage and determine the particular letter space in that zone at which the carriage will stop. That is to say, if we start with the carriage 8 at its starting point at the extreme right of its travel, we can strike any one of the keys 67 and determine whether we shall stop the carriage at the first, second, third, or fourth zone, etc., as the case may be.

In striking the key 67 it rocks the lever 80 so as to raise, at the rear end, a plunger 81. There is one of these plungers 81 for each lever 80, and the plunger rises freely provided the carriage 8 has not advanced to a position beyond the zone selected by the key 67 depressed at the moment. The plungers 81, however, do not operate positively in selecting a zone but each is connected flexibly, by means of a spring 88, to its floating slide 86, having pin-and-slot connections 87 with its plunger 81. The spring 88 is connected in each instance at one end to one of the pins 87 of the pin-and-slot connection, and at the other end to a pin 89 on the respective slide 86. The slides 86, however, are not permitted to rise and to perform their work until the carriage 8 has traveled to such a position that it comes to the initial portion of the zone or major column predetermined by the column-selecting key 67 actuated at the moment.

To prevent this rising of the slides 86, there is provided an obstructing, holding, or locking bar 90, slidably mounted in brackets 90ᵃ and 90ᵇ. The movement of this locking bar 90 (which has the same function as the bar 25 of the Wernery patent) is determined by the carriage 8, and takes place at the passage into successive zones or major columns of the printing point, which zones are determined by the carriage or column stops 59. To move it, the locking bar 90 is provided with a rack 93, meshing with a gear 94, from whence it is driven. This gear 94 is connected, by a shaft 95, to a star wheel 96, which is arranged to have its teeth project in the path of movement of the stops 59 carried by the carriage 8. As a stop 59 comes along, it will move the star wheel 96 one tooth, so as to move the locking bar 90 one step. A step movement of the locking bar 90 corresponds with the distance between the slides 86.

The locking bar normally projects above a series of tongues or lugs 91 provided on the slides 86, so as to prevent their upward movement under the pull of the springs 88. This locking bar 90, however, is provided with a single notch or groove 92, which will permit any one of the tongues 91 on a slide 86 to move up therethrough when brought in register therewith, provided this slide is under a tendency to move upward owing to the tensioning of its spring 88 by an accordant plunger 81 and its corresponding key 67. That is to say, since only one of the keys 67 will be depressed, only one of the springs 88 will be tensioned, so that there will be a tendency for but one of the slides 86 to move upward, and this particular slide can not rise until the carriage 8 has traveled through enough major columns or zones to have the bar 90 advanced to bring the notch 92 therein in register with this particular slide. It will thus be seen that the mechanism may be utilized to jump over one or more of the first major columns without writing therein, and arriving at some later column or zone in which writing or computing is to be done.

As soon as the bar 90 brings its notch 92 over the slide 86 of which the spring has been tensioned as described above, said slide will rise through the notch 92 and will rock a lever 82, which is universal to all of the slides 86 and capable of being rocked by any one of them. The particular connection is formed by slots 85ᵃ in the slides 86 engaging a rod or bail 85 carried by the lever 82. The lever 82 is provided with a bearing or idle roller 83 arranged to overlie a rail 84 connected to and extending the length of a rack 77 on which the column stops 59 are adjustably mounted at letter-space intervals. The rack 77 is pivotally mounted at 78 by means of brackets, and is normally held in a raised position by a spring 79, so that the stops 59 are held up in ineffective position. The springs 88 are each stronger than the spring 79 so that they can overcome its action. When, however, the lever 82 is rocked in the manner just described by the action of one of the springs 88 and its slide at the proper computing zone or column, then the rack 77 and the stops carried thereby will be depressed to an effective position, enabling the particular stop 59 which happens to be in position at that particular point in the travel of the carriage 8, to come into play.

Before this can have come about, however, the carriage 8 must of necessity have traveled along, and to enable the travel of the carriage, it is necessary, in this machine, to operate one of the tabulating keys 68, which will rock the lever 69 to raise a plunger 66 and bring the same into a position to intercept one of the stops 59 when the latter is depressed by a depression of its rack 77 as the carriage comes into the proper zone or major column. The depression of one of the tabulating keys 68 releases the carriage 8 by means of shoulders 70 provided on the plungers 66, engaging and raising one arm 71 of a lever pivoted at 72, so as to swing down another arm 73 of this lever, which draws on a link 74 to rock a lever 75, having at its front end a bearing roller 76 engaging a smooth portion of the rack 13, and raising it out of mesh with the pinion 12. This permits the carriage 8 to travel forward under the pull of the spring barrel 10.

As explained above, this forward movement of the carriage 8 will continue until the locking bar 90, which travels with the carriage in the opposite direction, has been advanced step by step until the notch 92 therein comes into register with the particular slide 86 tending to rise. When this occurs, this slide will immediately spring up, rocking the lever 82 and depressing the rack 77 to bring the particular stop 59 corresponding to the column-selecting key 67 actuated, within reach of the particular plunger 66 raised, so that the two may coöperate to stop the carriage 8 at any selected zone and at any point in such zone.

It will thus be seen that by the depression of first a column or zone-selecting key 67 and then a decimal-tabulating or letter-space selecting key 68 and holding them concomitantly depressed, not only any one of a plurality of zones or major columns may be selected, but also any one of the several letter-space or digit columns in such zone may be selected.

When a column-selecting key is thus operated, it not only moves a column-selecting stop 59 to a position where it will be intercepted by a plunger stop 66, but in so swinging said column-selecting stop, it brings a lug 97 at the front lower arm of said stop into position where it will catch the hook 60 which draws the computing machine carriage along. Thus said lug forms a denomination selecting device (as seen in Fig. 1). Normally the lug 97 travels clear of the hook 60 thus avoiding the noise and wear incident to having the hook 60 catch the column stop lug 97 every time it passes said hook.

Of course, if the rack 77 is normally held in a raised position by the spring 79, the tappets or stops 59 and their lugs 97 will be held clear of the hook 60 until the particular zone has been selected by the depression of the rack 77 at the right time, when the hook 60 and thus the master wheel may be advanced step by step with subsequent computing movements of the carriage 8.

In order to hold the column stops 59 in position to engage the hook 60 during an entire column, the column stops 59 are provided with rearwardly extending lugs 98, which lugs, when the rack bar 77 is depressed, will pass beneath a shelf or cam catch 99 pivoted on the frame of the machine on stub shafts 100. Said cam catch 99 is of the width of a column, and hence once a column stop 59 catches under it, said cam catch, as seen in Fig. 5, will hold said column stop down so that its lug 97 engages the hook 60 throughout the width of the column. The cam catch 99 normally is swung forward by its spring 149, and the column stops 59 are cut away at $59^a$ to accommodate said cam catch. These cutaway portions permit the column stops to normally pass the cam catch without touching, thus obviating the noise and wear which might otherwise occur.

Said cam catch, as seen in Fig. 10, preferably includes a cam 101 at its right-hand edge, so that the typewriter carriage in its movement in letter-feeding direction, will cause a shoulder $59^b$ on the stop 59 to force said cam catch outwardly, and a straight edge 102 formed as a continuation of said cam bears against the column stop 59 and holds said cam catch in its outward effective position throughout the width of one column. When the end of the column is reached, the column stop 59 passes beyond the straight edge 102 releasing the cam catch 99, and the rack bar 77 is swung up by its spring 79. This lifts the lug 97 clear of the hook 60, thus releasing it and permitting a spring $60^a$ to return the computing carriage to the beginning of its travel.

Whenever said cam catch 99 is in its effective position, it may maintain the numeral keys and the computing mechanism connected, while said numeral keys may be normally disconnected from the computing mechanism. For this purpose the hook 39 for each numeral key passes through a shifter bar 103, which when drawn to the left holds the hooks 39 under the lugs 38, so that every time a numeral key is depressed it will operate the computing machine connections in the manner above described. If, however, said shifter bar is moved to the right, it carries all the hooks 39 clear of the lugs 38, so that the numeral keys 1 are disconnected from the computing machine.

Said shifter bar is connected to the cam catch 99 in such a way that whenever the catch 99 is moved outward by a column stop 59, it may cause the hooks 39 to engage their respective lugs 38. The connections for accomplishing this include an elbow lever 104 formed as an extension of the cam catch 99, and said elbow lever whenever the cam catch 99 is forced outward draws upward a link 105, so as to swing a rock shaft 106 by means of a rock arm 107 thereon, thus drawing down a link 108 attached to a second rock arm 109 on said rock shaft 106; said link 108 when it is drawn downwardly rocks the shifter bar 103 to the left through an arm 110, which is connected to a lever 111; said shifter bar being attached to the lower end of said lever 111.

There is interposed between the arm 110 and the lever 111, a manually settable connection for making the link 108 effective or ineffective on the shifter bar 103. Said settable connection includes a lip 112 formed on an extension of the arm 110 beyond the pivot 113, on which said arm is pivoted; said lip underlying a pin 114 fast in a toothed segment 115. Said segment is connected to the lever 111 by a spring 116, which extends from a pin 117 in the segment to a pin 118 on the lever, so that whenever the link 108 draws downwardly the arm 110, the lip 112 on said arm will turn the segment so as to draw the spring 116 taut, thus drawing the shifter bar to hold the hooks 39 in their effective positions. The lever 111 also includes a bell crank extension 119, which overlies a pin 120, by which the link 108 is joined to the arm 110. Since the pin 114 on the segment 115 lies above the lip 112 of the arm 110 and the pin 120 underlies the bell crank arm 119 of the lever 111, the connections are such that the link 108 will almost positively move the lever 111 whenever said link moves up or down. Said settable connection may be set to make the connection ineffective. For this purpose the segment 115 meshes with an idle segment 121, which is pivoted on a post 122 on the frame of the machine. Said idle segment has fast thereon a handle 123, by which it may be revolved, so as to turn the segment 115 meshing therewith against the tension of the spring 116, thereby carrying the pin 114 up and away from the lip 112. Said segments are so arranged that when the handle 123 is carried a considerable distance around, the spring 116 will be thrown past the pivot 113 of the segment 115, and so bring and hold said segments set with the lip 112 on the side of the pivot 113 opposite from the pin 114. With the pin 114 in this position it will be seen that the link 108 is unable to draw the shifter bar 103 to effective position. This provides means whereby the numeral keys of the typewriter may be operated free of the computing mechanism by the mere throwing of a single handle 123. The shifter bar 103 is normally drawn to ineffective position by a spring 124 which is anchored in the frame of the machine and draws on the pin 120 fast in the lever 110. The segments 115 and 121 are prevented from revolving so far that they get out of mesh, by making the end teeth 121ª of one segment over size, thus preventing said teeth from fully turning to mesh with the other segment.

From what has been said, it will be understood that whenever a column key 67 is depressed it moves the cam stops 59 to effective position, and through the cam catch 99 the numeral key hooks 39 are moved to effective position. The machine is then in condition to do computing. In order to determine what kind of computing can be done, or whether computation shall be done at all, connections are provided between the column selecting keys and the clutch 31 in the computing train so that the operation of a column selecting key may determine how the computing connection shall operate through said clutch. To accomplish this result, each column selecting key is provided with a settable lug or interponent 125 formed as a collar slidable on a rearward extension 126 of the column selecting key lever 80. Whenever a column selecting key 67 is depressed, said lug may be set so as to strike one or the other of two bails 127 and 128, so as to shift the clutch 31 in one direction or the other. For this purpose said bails are fast to a shaft 129 on which shaft is fast a rock arm 130, which rock arm is connected to a shifter 131 for the clutch 31 by means of a link 132, attached to an elbow lever 133 formed on said shifter. In a position seen in Fig. 1 with no column selecting key depressed, the shifter 131 holds the clutch 31 set at a neutral position in which the shaft 30 may revolve idly without affecting the master wheel. Said figure shows the computing control collar 125 at its rearward position to which it has been moved by a shift link 134, there being one of said shift links on each tabulating key.

For operating said shift links to adjust the computing control collars 125, each tabulating key is provided with a hood 135, which covers most of the face of said key, and is formed integral with a shaft 136 extending downwardly through said key, said shaft having a crank arm 137 thereon, which is pivotally attached at 138 to the shift link 134.

It will be seen that by rotating the hood 135, its collar 125 may be set at any desired position within its range of movement along the extension 126 of the column key lever. When said collar is in its rearward position, a depression of the column selecting key lever will cause the computing mechanism to add. In order to indicate this visibly to the operator, the column selecting key 67 is provided with suitable notations 139, 140 and 141 on its upper surface marked respectively, "Add," "Sub," and "Neu." Whenever the collar 125 is at adding position, a broken away portion 142 of the hood 135 will permit the operative to see the word "Add" thus indicating that the mechanism is set for addition. Similarly the word "Sub" is exposed when the mechanism is set for subtraction, and "Neu" similarly for neutral.

In the present disclosure the machine is shown at Fig. 4 as having five column selecting keys, each of which includes a shift link 134 for determining whether the mechanism shall add, subtract or be neutral when a given column selecting key is operated. In order to retain the computing mechanism at adding, subtracting or neutral whenever a column key has been operated and released, a latch is provided which holds the clutch 31 set in whatsoever position it has been moved into by the column selecting key. For this purpose the shaft 129 to which the bails 127 and 128 are fast, has fast thereto a rock arm 142ª which extends to a point adjacent a latch 143, said latch being under the control of the cam catch 99. The connections are such that whenever a column selecting key 67 is depressed, with its collar 125 at the rearward position, as seen in Fig. 1, said collar will rock the arm 142ª forwardly, so that a pin 144 on said rock arm will catch behind a flat-sided notch 145 in the latch 143. A spring 146 anchored in said latch 143 and the rock arm 142ª draws on said latch and as soon as the pin 144 passes the edge of the notch, draws the pin into the notch, thus positively locking the computing connections at adding. In the meantime the operative has depressed the decimal tabulating key 68, causing the carriage of the typewriter to travel along in letter feeding direction, and when said carriage has arrived at the proper position, the proper column stop 59 will swing the cam catch 99 outwardly as has been above described. This outward swinging of the cam catch 99 causes a downwardly extending release or kick off arm 147 (see Fig. 5) of said catch to swing forward idly past a one-way catch 148. When the operative has written the required numbers in the column the latch 143 is released. This is done by the typewriter carriage which passes along so that the cam catch 99 is free from its column stop 59. A spring 149 (Fig. 2) then draws the cam catch 99 into its normal position, thereby swinging the release arm 147 of said catch rearwardly to the position seen in Fig. 1. In so swinging, the release arm 147 catches the flat face 150 of the release catch or trip 148, rotating said catch around its pivot 151, so that a lug 152 on said catch will strike a pin 153 on a plate 154, said plate being pivoted at 155 on a bracket fast on the typewriting frame. This swings the forward end of said plate 154 upwardly drawing up a link 156, said link being attached to the latch 143, with the result that the upward movement of said link 156 lifts said latch high enough to free the pin 144 from the notch 145. This permits the spring 146 to return the arm 142 and the bails attached thereto, to the mid-position seen in Fig. 1, thus returning the clutch 31 to neutral position. The trip 148 is normally held by a spring 157 in position to be struck by the extension 147.

Similarly if the collar 125 is in its forward position where it will cause the mechanism to subtract, the bails will be swung to draw the clutch 31 to subtracting position, and the pin 144 will catch in a subtraction notch 158 corresponding to the notch 145, and similarly the extension 147 of the cam catch 99 will release the latch 143 at the end of a column.

In order to relieve the numeral keys from operating the computing connections when the collars on the column selecting keys are set at neutral positions, means are provided for normally keeping broken the connection between the cam catch 99 and the shifter bar 103. To effect this, the rock shaft 106 in said connection is formed in two separated portions 159 and 160, on the latter portion of which is fast the rock arm 107, which is connected to the cam catch 99, while to the other portion 159 are attached the connections to the shifter bar 103. These portions are adapted to be clutched together every time a column selecting key sets the computing mechanism to add or subtract. For this purpose, the section 159 has slidably splined thereto a double clutch member 161 with teeth at each end thereof. The portion 160 of the shaft 106 extends as a sleeve 162 over the shaft 159, which sleeve 162 is enlarged at the center 163 to accommodate the double clutch member 161. The double clutch member is splined on the shaft 159 and has teeth at each end thereof and there are corresponding teeth in the opposite ends in the enlargement 163 of the sleeve 162. The connections to the column selecting keys are such, that whenever one of said keys shifts the bails 128 and 127, said bails move the clutch member 161 against one end or the other of the sleeve 162, thus closing the clutch. This closing occurs with the depression of any column selecting key, having a collar 125 set for either addition or subtraction, and therefore said clutch is always closed before the travel of the carriage brings a column stop 59 to swing the cam catch 99. The connections for moving the clutch 161 include a link 164 pivoted thereto and at the other end pivoted to the arm 142ª.

Means are provided whereby when any column selecting key is depressed to add, it will cause the typewriter to write in one color, whereas when said key is depressed to cause the mechanism to subtract, it will cause the typewriter to write in another color, preferably red. To accomplish this, the mechanism includes the usual Underwood bichrome ribbon vibrator mechanism, which comprises an actuator 165, mounted on the universal bar 16; said actuator is shiftable laterally on said universal bar so as to cause slots 166 in the actuator to engage either of two pins 170 and 171 fast on a ribbon vibrator lever 167, said lever being pivoted in the frame at 168 and carrying at its forward end the usual ribbon carrier 169. Said pins 170, 171, as is usual, are set at different distances from the pivot 168 of the lever 167, so that when the one of said pins 171, more remote from said lever, is engaged by the actuator, the ribbon will be given a comparatively small throw, and will bring its upper stripe between the type 7 and the platen 6, while if the pin 170 nearer the pivot engages said actuator the ribbon will be given a comparatively large throw, and the lower stripe will be interposed between the type 7 and the platen 6.

In the usual Underwood machine, said actuator is shiftable on said universal bar by keys 172 and 173, said keys being mounted on opposite sides of a rock shaft 174, which rock shaft is connected by a rock arm 175 and a link 176 to the actuator 165. To cause the ribbon to be shifted to the appropriate color by the operation of a column selecting key 67, there is provided a cam plate 177 comprising several cams which engage a freely swinging actuator shift lever 178 pivoted on the shaft 174 of the keys 172 and 173; said lever whenever moved to either side is arranged to move the rock shaft 174 by means of springs 179 and 180, said springs providing a desirable lost motion, there being one of said springs on either side of the shaft and extending down into the path of movement of the arm 178. The cam plate 177 is connected to the clutch controlling arm 142ª, by means of a link 181, so as to be shifted every time said arm 142ª moves, said link being pivoted to one arm 182 of a bell crank lever the other arm 183 of which is pivotally attached to the cam plate 177.

The ribbon controlling cam plate 177, which is shown in Figs. 3, 7, 8 and 9 in rear elevation includes a series of cams 184, 185 and 186, which are so placed as to automatically move the ribbon to write red whenever the mechanism is set for subtraction, but to write black whenever the mechanism is set to add or the computing mechanism is neutral. In shifting the computing connection from one to any other position, the cam plate is automatically simultaneously moved so as to carry one of its cams 184, 185 and 186 past an actuating pin 187, on the lever 178, and thereby throw the ribbon actuating mechanism to the desired color. The cams 184, 185 and 186 are so arranged that the ribbon may be set manually by means of the keys 172 and 173 to write either color at any time no matter in what position said cams may have automatically set the ribbon actuating mechanism. To accomplish this latter result, the ribbon control plate 177 stands in such a position that the keys 172 and 173 may be operated to manually throw the ribbon actuating mechanism into any desired position no matter to what position the computing mechanism is adjusted. This is accomplished by having the cams broken away at the point where the actuating pin 187 on the actuator shift lever 178 will swing free of said cams.

In Fig. 3 the actuator shift lever 178 is shown standing at black with the cam plate 177 at the position it occupies when the computing mechanism is set at neutral. In shifting from the position seen in Fig. 3 to the position seen in Fig. 8, the cam plate 177 moves idly past the actuator shift lever 178. If, however, the computing mechanism is moved to subtract, the cam plate will move downward as indicated by arrows in Fig. 9 to the position seen in Fig. 9 and the cam plate 186 will swing the actuator shift lever 178 to the right as shown by the arrow in Fig. 9, thus causing the typewriter to write red. It will be observed in this figure that the ribbon color key 173 may then be depressed manually to shift the actuator to cause the ribbon to write black if desired. This would swing the actuator shift lever 178 to the left, as seen in Fig. 9. If then, the computing mechanism were shifted to adding or neutral position, the pin 187 would strike the outer side of the cam 186, as seen in Fig. 7, thus holding the ribbon actuating mechanism in black writing position.

In Fig. 8 is shown the usual position of the ribbon 177 in moving from neutral black to adding black. If, in said figure the left hand ribbon key 172 were depressed, thus swinging the actuator shift lever 178 to the right, the cam 184 would strike the pin 187 as the cam plate 177 moves downward and shifts the actuator shift lever 178 to the position seen in Fig. 3. To accomplish these and other results, it will be noted that the cam 184 is shaped as a triangle, so that the two inward faces thereof both will move the actuator shift lever 178 to the left while the cams 185 and 186 are shaped as nearly right angle triangles having their hypotenuses facing each other in parallel spaced relation, thus forming a track between said cams in which the pin 187 of the actuator shift lever 178 will usually follow in going from neutral to subtraction, that is to say from black to red.

In order to prevent errors of various kinds, certain safety devices are provided. One of these safety devices consists of an interlock between the decimal tabulating keys and the column selecting keys of such a nature that it is impossible to operate any decimal tabulating key unless some column selecting key is first operated. This will prevent the carriage from being released from its escapement when no column stop 59 can be moved into effective position. Said interlock, as shown in Fig. 1 comprises a suspended locking bail 188 on rock arms 189, said rock arms being pivoted at each side of the frame of the machine 190; said bail 188 is normally drawn rearwardly by means of a spring 191, so that it lies under forwardly extending hooks 192 formed on the decimal tabulating key levers 69. Said hooks prevent the operation of any decimal key lever so long as the bail 188 is in its effective position. Said bail is, however, moved to ineffective position every time a column selecting key lever 80 is depressed. For this purpose each column selecting key lever is provided with an upwardly extending cam arm 193, which extends forwardly having a cam face 194 which, when the key is depressed swings the bail 188 clear of the hooks 192, thus permitting the depression of any decimal key lever.

Another safety device prevents the operation of any column selecting key after the column has been passed at which said column key is supposed to arrest the typewriter carriage. For this purpose the holding bar 90 is provided with an abutment 195 which lies to the right of the notch 92, as seen in Fig. 11, which is a rear view. In said figure the third column selecting key is shown as having been depressed, and having raised its slide 86 through the notch 92, so that the typewriter carriage will be arrested at the third column.

In moving the holding bar 90 to the position seen in Fig. 11 where its notch 92 permits the third column selecting slide to pass upward, said bar has brought the abutment 195 in front of the first two column selecting plungers 81, which are seen at the right hand in said figure. This has brought the abutment above lugs 196 (Fig. 1) formed on the plungers 81 and said abutment lies so close to said lugs, that it is impossible for the operative to raise the first two column plungers 81 by the operation of their respective column keys. In other words, the abutment acts as a lock against the operation of any column selecting key which might have been previously operated, but which it would be improper to operate at the present time.

The present computing machine, as seen diagrammatically in Fig. 10, is adapted for footing and cross adding, and for this purpose is provided with several footing totalizers 197, 198 and 199 besides one not shown above the cross-adding totalizer 19ª. These totalizers are operated in the usual manner in the Underwood-Wright machine from the motor 18 by means of a continuation 200 of the shaft 30, which operates the cross adding totalizers hitherto described. Said shaft operates the computing wheels in said totalizers, by means of a master wheel, not shown herein; said master wheel being connected to said shaft extension 200 by the manually reversible clutch 201 usual in the Underwood-Wright computing machine.

As is shown in the Underwood-Wright computing machine, the carry-over mechanisms, for all the totalizers not shown herein, are power driven from the drive shaft 22. The connections for effecting said drive include a bevel gear 202 on said drive shaft 22, which meshes with a bevel gear 203, on a carry-over drive shaft 204, said carry-over drive shaft driving a counter shaft 205, by means of bevel gears 206 and 207, which counter shaft has reversible clutches 208 and 209, which are connected by the usual levers to be shifted automatically, whenever the main clutches 31 and 201 of the computing mechanism are either of them shifted.

It will be observed that while the column stops 59 have been described as controlling the connection of the computing mechanism to the typewriter, somewhat similar column stops might be placed interchangeably with these which would serve only to arrest the typewriter carriage.

It will be further observed that the machine is well adapted to use by the average typist or book-keeper, because all the connections are effected by devices closely analogous to those in common use. Thus the finger pieces which control adding and subtracting, are parts of column-selecting keys adjacent the typewriter keyboard, and therefore analogous to keys now in use. Moreover, the finger-piece 123 which disconnects the keys from the computing mechanism, is close to the keyboard and analogous to ribbon shift and platen shift devices now in use. The column stops 59 may be uniform in shape, and are the only parts of the mechanism in an awkward position to adjust. Similar parts are found on most machines now on the market in similar positions. It will be observed that if the machine is sometimes used for computing on a given form, and the rest of the time for writing narrative matter, the finger caps 135 of the keys 67 may always be left adjusted to enable the computing on said form. Then for typewriting the narrative matter, the finger-piece 123 may be thrown to disconnecting position until the typewriting is completed, and at the completion of the narrative work the finger-piece may be thrown back again.

Variations may be resorted to within the scope of the invention, and portions of the improvements may be used without others.

Having thus described my invention, I claim:

1. In a combined typewriting and computing machine, the combination with a traveling carriage and column-selecting keys therefor, of settable means associated with each column-selecting key for determining whether said combined machine shall add or subtract.

2. In a combined typewriting and computing machine, the combination with a traveling carriage and column-selecting keys therefor, of settable means mounted on each column-selecting key for determining whether said machine shall add or subtract.

3. In a combined typewriting and computing machine, the combination with a traveling carriage and computing devices, of a rack on said traveling carriage, stops settable on said rack to determine the columnar position of said carriage, a tabulating device comprising column-selecting keys coöperating with said stops, and settable means associated with each column-selecting key for determining whether said computing devices shall add or subtract.

4. In a combined typewriting and computing machine, the combination with a traveling carriage and a rack bar thereon, of stops settable along said rack bar, column-selecting keys, settable means associated with each column-selecting key for determining whether the combined machine shall add or subtract, connections between the typewriting and computing mechanism, and means controlled *seriatim* by said column stops for determining how long the connections between the computing mechanism and the typewriting machine shall be effective.

5. In a combined typewriting and computing machine, the combination with a traveling carriage and numeral keys, of computing devices, stops settable for determining the position of columns during the travel of said carriage, decimal selecting and column-selecting keys for coöperating with said stops to select desired letter spaces in selected columns, means operated by said stops for selecting the letter spaces in the travel of the typewriter carriage in which computing shall be done, and means operated by said stops for automatically connecting the numeral keys with the computing devices during the time writing is done in one column.

6. In a combined typewriting and computing machine, the combination with numeral keys and a traveling carriage, of column stops settable to locate columns during the travel of said carriage, coöperating column-selecting keys, means associated with each column-selecting key for determining whether the combined machine shall add or subtract, a catch for holding the mechanism in adding or subtracting position, and means under control of the carriage for releasing said catch at the end of a column.

7. In a combined typewriting and computing machine, the combination with a traveling carriage, and stops settable thereon to determine the position of columns, of coöperating column-selecting keys, means for moving said column stops to effective position when they approach the column selected by the column-selecting key operated, computing mechanism effective or ineffective as determined by said column stops, means for holding said column stops to hold said computing mechanism effective, and means for returning said column stops to their normal ineffective position when said traveling carriage has passed the column in which computing is being done.

8. In a combined typewriting and computing machine, the combination with a traveling carriage and column stops settable thereon, said stops being normally in ineffective position, of column-selecting keys, means for moving said column stops to effective position when they approach the column selected by the column-selecting key operated, means associated with each column-selecting key for determining whether the computing mechanism shall add or subtract, and means under the control of the column stops for restoring the connection between the numeral keys and the computing mechanism to normal position.

9. In a combined typewriting and computing machine, the combination with a traveling carriage and settable identical column stops whereby it may be selectively positioned, of means normally holding said stops in ineffective position, column-selecting keys for moving said stops to effective position when the typewriter carriage approaches the desired column, computing devices under the control of said column-selecting keys for adding or subtracting, and means controlled by said column stops for determining at what letter spaces the computing devices shall be effective for adding or subtracting.

10. In a combined typewriting and computing machine, the combination with numeral keys and a traveling carriage, of column-selecting keys, means settable on said column-selecting keys for determining whether said numeral keys shall be effective to add or subtract, and means under the control of said carriage for determining at what letter spaces the setting to adding or subtracting shall be effective.

11. In a combined typewriting and computing machine, the combination with a traveling carriage, of stops settable for selectively positioning it, said stops being normally in an ineffective position, column-selecting keys for moving said stops to an effective position, numeral keys, means for connecting said numeral keys to the computing mechanism to add or subtract, and means controlled by said column stops for determining at what letter spaces said connection shall be effective.

12. In a combined typewriting and computing machine, the combination with computing wheels and numeral keys, of a reversible clutch between said keys and wheels, column-selecting keys, and means settable on each column-selecting key for determining how said clutch shall be effective on said wheels.

13. In a combined typewriting and computing machine, the combination with numeral keys and computing devices, of column stops normally in an ineffective position, tabulating keys for moving said column stops to effective position, and a device movable by said column stops when in effective position for controlling the connection between the numeral keys and the computing devices, said device being normally unaffected by said column stops.

14. In a combined typewriting and computing machine, the combination with numeral keys and computing devices, of a normally ineffective connection between said keys and said devices, a traveling carriage, column stops for positioning said carriage, said column stops being normally in ineffective position throughout the travel of said carriage, and means for making the connection between said keys and said devices effective by moving said column stops to effective position.

15. In a combined typewriting and computing machine, the combination with numeral keys and computing wheels, of a reversible clutch between said keys and said wheels, a catch for holding said clutch in whatsoever position it is set, a traveling carriage, column-selecting keys for positioning said carriage, means associated with each column-selecting key for positioning said clutch, and a device for releasing said catch when the typewriter carriage passes beyond the column in which computing is being done.

16. In a combined typewriting and computing machine, the combination with a cross-adding device, of a traveling carriage, column stops normally ineffective settable on said traveling carriage, a hook or latch associated with said cross-adding device, column-selecting keys for moving said column stops to effective position, to automatically engage said hook, and a device for holding said column stops in position to engage said hook throughout the column in which computing is being done.

17. In a combined typewriting and computing machine, the combination with a cross-adding device, of a traveling carriage, column stops normally ineffective settable on said traveling carriage, a hook or latch associated with said cross-adding device, column-selecting keys for moving said column stops to effective position, to automatically engage said hook, a device for holding said column stops in position to engage said hook throughout the column in which computing is being done, numeral keys and computing wheels, a connection between said keys and said wheels which is normally ineffective, and means for making said connection effective by the device which holds the column stops effective.

18. In a combined typewriting and computing machine, the combination with a traveling carriage and column-selecting keys, of levers for said keys, an interponent settable on each key lever, and means under the control of said interponent for determining whether the combined machine shall add or subtract.

19. In a combined typewriting and computing machine, the combination with a traveling carriage and column-selecting keys, of levers for said keys, a lug settable on each key lever, computing wheels, a normally ineffective connection between said keys and said wheels, and means for making said connection effective by said lug.

20. In a typewriting machine, the combination with a traveling carriage and column-selecting keys for positioning said carriage, of levers for said keys, an interponent settable on each of said levers, a computing device and means on each key for setting said interponent to control said computing device.

21. In a combined typewriting and computing machine, the combination with a traveling carriage and a cross-adding device, of normally ineffective column stops for arresting said traveling carriage, a hook for intermittently connecting said cross-adding device to said carriage, a lug on each column stop effective to catch said hook when the column stop is moved to effective position, column-selecting keys for so moving said column stops, and means settable on each column-selecting key for determining whether said cross-adding device shall be effective to add or subtract as a result of the operation of a key having its means set.

22. In a combined typewriting and computing machine, the combination with a traveling carriage and a cross-adding device, of normally ineffective column stops for arresting said traveling carriage, a hook for intermittently connecting said cross-adding device to said carriage, a lug on each column stop effective to catch said hook when the column stop is moved to effective position, column-selecting keys for so moving said column stops, means settable on each column-selecting key for determining whether said cross-adding device shall be effective to add or subtract as a result of the operation of a key having its means set, numeral keys, a normally ineffective connection between said numeral keys and said cross-adding device, and means for making said connection effective whenever a column stop is moved to effective position.

23. In a combined typewriting and computing machine, the combination with numeral keys and a traveling carriage, of column-selecting keys for positioning said traveling carriage, a cross-adding device, and means associated with each column-selecting key for determining how the numeral keys shall be effective on said cross-adding device.

24. In a combined typewriting and computing machine, the combination with computing wheels and a traveling carriage, of column stops for positioning said carriage, a rack bar on which said stops are settable, a device adapted to be carried along by said carriage to select denominations one after another on said wheels, said column stops and device being normally in an ineffective position, column-selecting keys for moving said rack bar to bring the column stops and denomination-selecting device into effective relation, and means for holding said denomination-selecting device in its effective position throughout the column.

25. In a combined typewriting and computing machine, the combination with a traveling carriage, a computing device, and a device traveling therewith for selecting denominations one after another on said computing device and normally in an ineffective position, of column-selecting keys, and means operated by each column-selecting key for moving said denomination device to effective position when the desired column has been reached.

26. In a combined typewriting and computing machine, the combination with a traveling carriage and column stops settable thereon, of a denomination-selecting device effective on the computing mechanism connected to at least one of said column stops, means normally holding said column stops and said denomination-selecting device in ineffective position, column-selecting keys, means operated by a column-selecting key for moving said selecting device and its column stop to effective position when the desired column has been reached, and means automatically holding said stop and said selecting device in effective position throughout the column, and releasing them at the end of said column to permit them to return to normally ineffective position.

27. In a combined typewriting and computing machine, the combination with a traveling carriage, numeral keys and computing wheels, of column-selecting keys for positioning said carriage, means associated with each column-selecting key and manually settable to determine whether said numeral keys shall cause said wheels to add or subtract, a normally ineffective denomination selector mounted on said carriage, and means for moving said denomination selector into effective position by the operation of one of said column-selecting keys.

28. In a combined typewriting and computing machine, the combination with a traveling carriage, numeral keys and computing wheels, of column-selecting keys for positioning said carriage, means associated with each column-selecting key and manually settable to determine whether said numeral keys shall cause said wheels to add or subtract, a normally ineffective denomination selector mounted on said carriage, means for moving said denomination selector into effective position by the operation of one of said column-selecting keys, and means for holding said denomination selector in an effective position throughout the width of the column which has been selected, and then releasing said denomination selector to return it to normally ineffective position.

29. In a combined typewriting and computing machine, the combination with a traveling carriage and column stops settable thereon, of denomination-selecting devices similarly settable thereon, means for normally holding said stops and said devices in ineffective position, column-selecting keys, means associated with each column-selecting key for determining whether said combined machine shall add or subtract, and means moving said stops and said denomination-selecting devices to effective positions by the operation of one of said column-selecting keys.

30. In a combined typewriting and computing machine, the combination with a traveling carriage and column stops settable thereon, of column-selecting keys, computing devices effective in the columns determined by said column stops, means for causing said computing devices to be effective to add or subtract, column-selecting keys for positioning said carriage by said column stops, and means for preventing the operation of a column-selecting key after the carriage has passed the column in which said key should arrest it.

31. In a combined typewriting and computing machine, the combination with a traveling carriage and column stops settable thereon, of a denomination-selecting device normally in an ineffective position, column-selecting keys, means for moving said denomination-selecting device to effective position by the operation of said column-selecting keys, and means for holding said device in effective position throughout the column in which the carriage has been arrested.

32. The combination with a computing mechanism, of a carriage traveling to determine the different computing zones for said computing mechanism, zone-controlling units each corresponding to a particular zone as determined by said carriage for said computing mechanism, state-controlling mechanism for governing the character of computation carried on by said computing mechanism, and separately settable governing elements individual to each of said zone-controlling units for actuating said state-controlling mechanism during the travel of the carriage to produce only the particular state for the zone corresponding to the zone-controlling unit effective at the moment.

33. The combination with a computing mechanism, of a traveling carriage adapted to determine the different computing zones of said computing mechanism, normally ineffective state-controlling mechanism for varying the character of computation in said mechanism, automatic means adapted to be made effective at will to cause said state-controlling mechanism to set up any desired state in said computing mechanism for any zone selected by the carriage, and means operated from the carriage for automatically causing reversion to said normally ineffective state after a zone has been passed.

34. The combination with a combined typewriting and computing mechanism including typewriter numeral keys, of a state-controlling mechanism adapted to determine how the numeral keys shall be effective on the computing mechanism, a traveling typewriter carriage adapted to select different computing zones for said computing mechanism, operating devices for setting said state-controlling mechanism so that it will select a predetermined character of computation for the computing zone selected by the carriage, and automatic means for bringing the state-controlling mechanism to neutral state after each computing zone has been passed.

35. In a combined typewriting and computing machine adapted to compute in several zones, the combination with typewriter numeral keys including key levers, connections normally interrupted at the numeral key levers, whereby either adding or subtracting may be done by said keys, controlling means whereby said connections may automatically determine whether they shall add or subtract, devices for automatically establishing said connections at the numeral key levers whenever they are set for adding or subtracting, and means for automatically returning said controlling means from adding or subtracting position to neutral when a computation is completed in any zone.

36. In a combined typewriting and computing machine, the combination with numeral keys, a traveling carriage and computing wheels, of a normally ineffective denomination selecting device for determining in which of said wheels numbers written in typewriting shall be registered, column-selecting keys, means controlled by said column keys for determining whether the numbers shall be registered, and whether they shall be added or subtracted, and connections whereby at the end of registering any complete number the registering means becomes ineffective.

37. In a combined typewriting and computing machine, the combination with typewriter numeral keys forming part of the typewriter keyboard, and a traveling carriage, of computing devices adapted to compute in various columns in the travel of said carriage, connections whereby said keys cause said computing devices to add or subtract, finger-pieces adjacent said keyboard, separately settable to determine whether said connections shall cause addition or subtraction in any column, and a separate finger-piece adjacent said keyboard, settable to make said connections effective or ineffective.

38. In a combined typewriting and computing machine, the combination with typewriter numeral keys and a traveling carriage, of computing devices adapted to compute in columns selected by said carriage, connections including normally neutral shiftable means for causing said keys to effect computations additively or subtractively in said devices, and means for automatically shifting said shiftable means in bringing said carriage to any zone from any other zone, so that by a single shift said means shall determine whether the computations shall be in addition or subtraction.

39. In a computing machine, the combination with numeral keys and a traveling carriage, of computing wheels, printing devices controlled by said keys, connections whereby said wheels may add or subtract the numbers printed, column-selecting keys for positioning said carriage, a device adjacent said column keys adapted to control said adding and subtracting, and means adjacent the finger end of the column keys for selectively causing each key to be effective on said device to cause said adding and subtracting.

40. In a computing machine, the combination with numeral keys and a traveling carriage, of computing wheels, printing devices controlled by said keys, connections whereby said wheels may add or subtract the numbers printed, column-selecting keys for positioning said carriage, a device adjacent said column keys controlling the connections whereby adding and subtracting are done, interponents slidable along said keys to selectively shift said device, and indicators, adjacent the finger end of said column keys, to show how the interponents will be effective.

41. In a combined typewriting and computing machine, the combination with typewriter alphabet and numeral keys, and a traveling typewriter carriage, of computing devices, normally ineffective connections whereby said devices may add or subtract the numbers written by said numeral keys, column selecting keys for positioning said carriage, a universal device adjacent said column keys, adapted to select said adding or subtracting, means operated by said device for making said connections selectively effective, settable means whereby each of said column keys may operate said device or not at will, and means whereby said carriage automatically makes said connections ineffective.

42. In a combined typewriting and computing machine, the combination with a traveling typewriter carriage, of computing devices including computing wheels, numeral keys for controlling said computing devices, a reversing mechanism for causing said keys to be effective on said wheels to cause them to add or subtract, said mechanism including means whereby the keys when operated may be neutral with respect to the computing devices, and means effective at the end of a computing column to automatically make said mechanism neutral.

43. In a combined typewriting and computing machine, the combination with computing wheels and numeral keys, of a reversing mechanism for determining whether said wheels shall be effective to add, subtract or be neutral at each depression of said keys, a traveling carriage for selecting denominations on said wheels, and means made effective by said carriage at the end of a computing column to automatically set said mechanism to neutral.

44. In a combined typewriting and computing machine, the combination with numeral keys and computing wheels, of a clutch between said keys and said wheels settable to cause said keys to add, subtract or be neutral on said wheels, a catch for holding said clutch in whatever position it is set, a traveling carriage, column-selecting keys for positioning said carriage, means associated with each column-selecting key for positioning said clutch, and a device for releasing said catch and causing said clutch to be neutral when the typewriter carriage passes beyond the column selected by the column key.

45. In a combined typewriting and computing machine, the combination with numeral keys and computing wheels, of a clutch between said keys and said wheels to cause said keys to add, subtract or be neutral on said wheels, a catch for holding said clutch in whatever position it is set, a traveling carriage, means for automatically setting said clutch and simultaneously positioning said carriage, and a device for releasing said catch to cause said clutch to be neutral when the typewriter carriage passes beyond the column selected by the column key.

46. In a computing machine, the combination with computing wheels and numeral keys, of a key operable to connect said keys to said wheels to effect computations, and means shiftable on said key to determine whether the computation so effected will be additive or subtractive.

47. In a combined typewriting and computing machine, the combination with a traveling typewriter carriage and a device adapted to be intermittently picked up thereby to effect cross adding, of normally ineffective means on said carriage for so picking it up, computing wheels, numeral keys, a key operable to connect said keys to said wheels, and means for making the carriage pick-up effective by the shifting of said connecting key.

48. In a combined typewriting and computing machine, the combination with a traveling typewriter carriage and computing wheels, of numeral keys normally disconnected from said wheels, keys adapted to cause said numeral keys to effect selectively addition or subtraction on said wheels and to connect said numeral keys to said wheels, and means under the control of said carriage for holding said numeral keys connected to said wheels during the writing of all the digits of a number and then releasing said connection.

49. In a computing machine, the combination with a member shiftable to cause addition or subtraction, of a single latch for holding said member in either position, a spring normally tending to draw said latch and member together, but holding said member in whatever position it is set, and means for releasing said latch to permit said member to be drawn by said spring to an intermediate position to make it ineffective, to cause either addition or subtraction.

50. In a combined typewriting and computing machine, the combination with a column-selecting mechanism including a set of selecting devices, of a traveling carriage for which said mechanism is adapted to select the columns, a computing mechanism, and individually adjustable means associated with each selecting device for determining whether said computing mechanism shall add or subtract at the selection of that column.

51. In a combined typewriting and computing machine, the combination with column-selecting keys, of a traveling carriage adapted to be positioned by the column-selecting keys, computing mechanism, means associated with each key and individually adjustable to determine whether the computing mechanism shall be effective to add or subtract at the operation of that key, and means effective at the end of a computing operation to cause said computing mechanism to assume its normal state.

52. In a combined typewriting and computing machine, the combination with a column-selecting mechanism including a set of selecting devices, of a traveling carriage for which said mechanism is adapted to select the columns, a computing mechanism, individually adjustable means associated with each selecting device for determining whether said computing mechanism shall add or subtract at the selection of that column, and means effective at the end of a computing operation to cause said computing mechanism to assume its normal state.

53. In a combined typewriting and computing machine, the combination with a traveling carriage and a computing mechanism operable for either addition or subtraction, of a tabulating mechanism for selecting the column to which the carriage is to be tabulated, means individually preadjustable for each column and subsequently operable by said tabulating mechanism to determine whether the computing mechanism shall add or subtract in each column, and means effective at the end of a computing operation to cause said computing mechanism to assume its normal state.

54. In a printing computing machine adapted to be set to perform additive or subtractive types of computation, the combination with a traveling carriage adapted to select any of several columns to print in, of connections whereby the positioning of the carriage to cause printing in a given column may determine the color of the printing in said column to accord with the type of computation to be performed in that column, the arrangement of parts being such that the printing color may be manually changeable at will irrespective of the type of computation after having been automatically determined in positioning the carriage.

55. In a combined typewriting and computing machine, the combination with a carriage and a zone or column-selecting mechanism, of a computing device capable of addition or subtraction, a set of individually settable devices, one for each zone, for selectively predetermining whether the computing device shall add or subtract in that zone, and means dependent upon the operation of said column-selecting mechanism to tabulate the carriage to any selected column, for bringing into use the predetermining device associated with the selected column, whereby the computing device is set automatically to addition or subtraction, as predetermined for the selected column.

EDWARD THOMAS.

Witnesses:
F. E. ALEXANDER,
E. B. LIBBEY.